(12) United States Patent
Bedingfield et al.

(10) Patent No.: US 7,978,836 B2
(45) Date of Patent: Jul. 12, 2011

(54) METHODS, SYSTEMS, AND PRODUCTS PROVIDING ADVANCED INTELLIGENT SERVICES

(75) Inventors: James C. Bedingfield, Lilburn, GA (US); Robert A. Koch, Norcross, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 60 days.

(21) Appl. No.: 12/549,551

(22) Filed: Aug. 28, 2009

(65) Prior Publication Data

US 2009/0316866 A1    Dec. 24, 2009

Related U.S. Application Data

(63) Continuation of application No. 11/521,951, filed on Sep. 15, 2006, now Pat. No. 7,599,481, which is a continuation of application No. 10/245,518, filed on Sep. 17, 2002, now Pat. No. 7,127,051.

(51) Int. Cl.
*H04M 3/42* (2006.01)
*H04M 7/00* (2006.01)

(52) U.S. Cl. ......... 379/201.01; 379/221.08; 379/221.14; 455/445; 455/461

(58) Field of Classification Search ............ 379/201.01, 379/221.14, 221.08; 455/445, 461
See application file for complete search history.

(56) References Cited

U.S. PATENT DOCUMENTS 5,768,358 A * 6/1998 Venier et al. ............. 379/221.14
* cited by examiner

*Primary Examiner* — Thjuan K Addy
(74) *Attorney, Agent, or Firm* — Scott P. Zimmerman PLLC

(57) ABSTRACT

Methods, systems, and products provide advanced intelligent services. A dialed number is associated to an advanced telephony service. The advanced telephony service is associated to a virtual number in a service providing network. A call to the dialed number is received in a native transport network having limited or no capability of providing advanced telephony service. When the advanced telephony service is required, then the call is routed to the virtual number in the service-providing network to receive the advanced telephony service from the service-providing network.

20 Claims, 6 Drawing Sheets

METHODS, SYSTEMS, AND PRODUCTS PROVIDING ADVANCED INTELLIGENT SERVICES

CROSS-REFERENCE TO RELATED APPLICATIONS

This application is a continuation of U.S. application Ser. No. 11/521,951, filed Sep. 15, 2006, now issued as U.S. Pat. No. 7,599,481, which is a continuation of U.S. application Ser. No. 10/245,518, filed Sep. 17, 2002 and now issued as U.S. Pat. No. 7,127,051, with both applications incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates generally to telecommunications systems and methods. More specifically, the present invention relates to systems and methods for providing advanced telephony services using elements within a service providing network which is separate from the transport network which would normally be used to carry a customer's calls, an example being providing advanced telephony services to a wireless customer using a wireline network-based universal telephone number.

BACKGROUND OF THE INVENTION

Telecommunications service providers, such as regional bell operating companies (RBOC), competitive local exchange carriers (CLEC), internet-protocol (IP) telephony providers, and the like, utilize a variety of infrastructure elements to support their subscribers. For example, an RBOC network typically includes an advanced intelligent network (AIN). The AIN quickly and efficiently routes and terminates a plurality of telephone calls within and between wireline telephone networks, the public-switched telephone network (PSTN), long distance carrier networks, and/or wireless telephone networks. The AIN includes a plurality of interconnected switches, transfer points, service control points (SCPs), databases, and various other network elements to route the telephone calls to the proper destinations and to provide advanced telephony services.

By utilizing these components, the AIN is capable of providing a plurality of advanced telephony services to a wireline PSTN subscriber during a telephone call, such as call delivery services, call forwarding services, call rescue services, custom ring-pattern services, call logging services, and call reporting services. The AIN may also provide voicemail services, custom messaging services, message notification services, message waiting indicator services, caller identification (caller ID) services, privacy director services, anonymous call rejection services, usage monitoring services, personal identification number (PIN) override services, and the like.

For example, BellSouth's Privacy Director service allows a subscriber to screen incoming telephone calls. If a telephone call is received from an unknown or a blocked caller, such as a telemarketer, the caller is presented with a message and a prompt that indicates, "if you [the caller] want this telephone call to be delivered to our [the wireline telephone service provider's] subscriber, you must either record your name so that we may deliver it to our subscriber or unblock your telephone number so that we may look your name up and deliver it to our subscriber." The subscriber then has the option of accepting the telephone call from the now known or unblocked caller, sending the telephone call to voicemail, or presenting the caller with an announcement indicating that the subscriber does not accept telephone calls of this nature.

An example usage monitoring service allows a subscriber to prepay for a "bucket" or predetermined amount of telephone usage time, or to sign an agreement agreeing to pay a plurality of different rates for a plurality of predetermined levels of telephone usage time. For example, the subscriber may agree to pay a higher rate for a relatively low level of telephone usage time and a lower rate for a relatively high level of telephone usage time. In any case, such a usage monitoring service requires a telephone service provider to keep careful track of the subscriber's telephone usage time, possibly across more than one network, e.g., a wireline and wireless network if the single bucket of usage time can apply to both wireline and wireless calls.

Unfortunately for many service providers, the infrastructure necessary to support such advanced telephony features is prohibitively expensive. Many competitive local-exchange carriers, wireless telephone service providers, IP-based telephone service providers, and the like cannot afford the expense of installing and maintaining this infrastructure. Thus, many of the advanced telephony services described above are not available to their subscribers. Conversely, embedded infrastructures to provide such services may exist in other networks and not be fully utilized because of the inability to reach subscribes in other telecommunications networks.

Thus, what are needed are systems and methods for providing advanced telephony services to subscribers in telecommunications systems lacking the infrastructure to support these advanced services by accessing capabilities in other networks that can provide such services.

BRIEF SUMMARY OF THE INVENTION

Embodiments of the present invention provide advanced telephony services to telephone numbers served by telecommunications networks lacking the infrastructure to provide these advanced services directly. For purposes of clarity, the following definitions are made. A service-providing network is a network with the capability of providing advanced telephony services to a service subscriber for calls that traverse it. A native transport network is a network that naturally carries a subscriber's calls but does not have the capabilities required to provide advanced services. In one embodiment, a telephone number in a service-providing network utilizes a service provided by an element in its network. The service-providing network element provides the services to a telephone in a second telecommunications network, which is in communication with the service-providing network, using the same telephone number.

The telecommunications networks providing and utilizing the advanced services may be wireline or wireless. They may rely on circuit or packet-switching technologies. Some embodiments may utilize combinations of several types of networks. The network elements providing the services may be based on advanced intelligent network (AIN), Internet protocol (IP), or other relevant standards. For example, in one embodiment, the network element that provides the advanced service is a service control point (SCP). In other embodiments, the element may be a media gateway controller, softswitch, application server, web server, media server, media gateway, or some combination thereof.

An embodiment of the present invention may provide any number of services. For example, the services may include one or more of the following: a call delivery service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, and a personal identification number (PIN) override service.

In one embodiment, the service-providing network monitors the usage (e.g., to provide a billing service) of a telecommunications service in separate native transport network. For example, a wireline service provider may use an embodiment to monitor usage for a subscriber in a wireless network (in addition to within the wireline network.

In an embodiment of the present invention, a service-providing network monitors various aspects of a communication for a subscriber whose telephone number exists in a separate native transport network. In one embodiment, the service-providing network monitors the start and end times of a communication to or from the subscriber's telephone number. By monitoring the start and end times of the communication, the service-providing network is able to calculate a communication duration. The service-providing network is therefore able to provide a logging, billing, or other service that either already exists or is easily provided by the service-providing network, but that would otherwise be prohibitively expensive or otherwise impractical to build in the native transport network. In another embodiment, the service-providing network monitors the status of a call, such as "Call Complete," "Line Busy," or "Call Terminated."

In an embodiment of the present invention, a subscriber's telephone number that exists in a native transport network is associated with advanced services in another network (a service-providing network). In one embodiment, a wireline service provider establishes a virtual telephone number in a first network (e.g., a wireline network) and associates services with the virtual telephone number. A second service provider, a wireless, wireline, or packet voice-based network then associates a subscriber's telephone number in the second network with the virtual telephone number in the first network. In another embodiment, the telephone number in the first network is not a virtual number, but instead is the subscriber's number in the first network. When a call is directed to or is made from the second number, the call is routed to the first number so that advanced services can be provided by the first (service-providing) network. Once the service is provided, the call is routed to the original destination. In such an embodiment, therefore, an advanced service that is provided using elements of a wireline (service-providing) network is made available to a subscriber whose telephone number does not exist within that network, but rather exists within a wireless (native transport) network.

The service provider in the native transport network may associate the two telephone numbers through various means. In one embodiment, the native transport network includes a data store for storing the association. This data store may be a database or other appropriate data storage device. The data store may include additional information necessary to effectively and efficiently deliver the advanced service. For example, in one embodiment, the data store includes a user profile. The user profile includes information about the subscriber and associates the two telephone numbers. The profile may also include information regarding a subscriber's service preferences.

In a method according to the present invention, once the provider of the native transport network associates the two telephone numbers, calls directed to the number in the native transport network receive advanced telephony services provided by a network element in the service-providing network. After the network element in the service-providing network provides the services, the call continues to the intended destination. Modifications to the network messaging accompanying calls may also be provided to ensure, for example, that a correct caller ID is displayed at the terminating end of the telephone call. A system according to the present invention may utilize conventional switches and other AIN network elements, softswitches, or other application servers, as they are developed and deployed.

In one embodiment of the present invention, the service-providing network provider bills a monthly charge for utilizing an advanced service or bills a charge each time the service is used. The service-providing network provider may also bill for each additional telephone number utilizing advanced services from another (native transport) network.

Embodiments of the present invention provide numerous advantages over conventional systems and methods. An embodiment provides systems and methods for providing advanced telephony services, such as those provided in a conventional AIN, to a subscriber in another wireline, wireless, or packet voice-based network without the need for true, prohibitively expensive service-providing elements. The present invention also provides systems and methods that allow a large, well-established service provider, with the financial resources necessary to design, deploy, and maintain an infrastructure capable of supporting such advanced services, to increase revenue by reaching a broader market that includes wireline, wireless, and packet voice-based telephone subscribers, which would be otherwise unreachable.

In addition, embodiments of the present invention provide great flexibility to a service provider in providing a subscriber access to these services. The service provider is able to disassociate a subscriber's telephone number from a physical "loop" or telephony network. This disassociation occurs in ordering systems, support systems, billing systems, and in the physical "loop" or telephony network. In other words, in various embodiments of the present invention, a subscriber's advanced telephony services are available across platforms.

Further details and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF THE INVENTION

Figure 1:
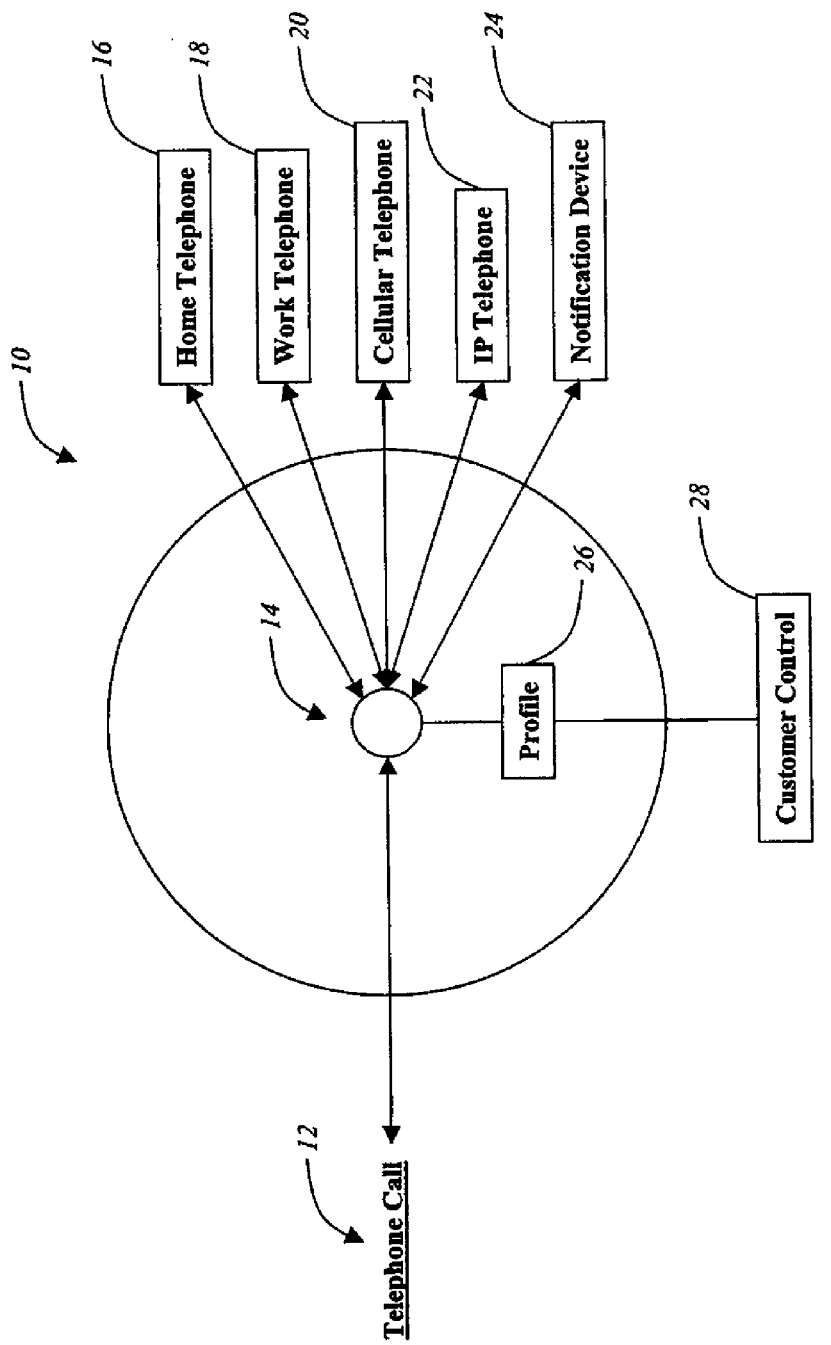
FIG. 1 is a schematic diagram of one embodiment of a system for providing advanced telephony services to a plurality of subscribers using a virtual telephone number.

Referring now to the Figures in which like numerals indicate like elements throughout the several Figures, FIG. 1 is a schematic diagram of one embodiment of a system for providing advanced telephony services to a plurality of subscribers. In the embodiment shown, a system 10 for providing advanced telephony services to a plurality of subscribers includes a telephone call 12 which is routed into or out of a telecommunications network 14 belonging to a telecommunications service provider. This telecommunications network 14 is also referred to herein as the service-providing network because all communications that take advantage of the advanced telephone services are routed through telecommunications network 14. The telecommunications network 14 includes a switch and an application server, which is described below. The application server is operable for providing a plurality of advanced telephony services to a subscriber for each telephone call 12. In an AIN environment, the application server may be an SCP. Other network elements, including, but not limited to softswitches, media gateway controllers, web servers, media servers, and media gateways, may also be included in telecommunications network 14 to provide the advanced telephony services. These advanced telephony services may include, for example, call delivery services, call forwarding services, call rescue services, custom ring-pattern services, call logging services, and call reporting services. The application server may also provide voicemail services, custom messaging services, message notification services, message waiting indicator services, caller identification (caller ID) services, privacy director services, anonymous call rejection services, usage monitoring services, personal identification number (PIN) override services, and the like.

The telecommunications network 14 is in communication with a plurality of callers, subscribers, and/or other individuals via the public-switched telephone network (PSTN), which includes incumbent local exchange carriers (ILEC), competitive local exchange carriers (CLEC), and inter-exchange carriers (IXC). In the embodiment shown, the telecommunications network 14 is directly or indirectly in communication with a subscriber's wireline telephones or devices, such a home telephone 16 or work telephone 18. The telecommunications network 14 is also in communication with a plurality of callers, subscribers, and/or other individuals via a wireless telephone network. The telecommunications network 14 also is directly or indirectly in communication with the subscriber's wireless telephone or device, cellular telephone 20 in FIG. 1. The telecommunications network 14 is further in communication with a plurality of callers, subscribers, and/or other individuals via a packet voice or Internet-protocol (IP)-based telephone network. The telecommunications network 14 is directly or indirectly in communication with a subscriber's IP-based telephone or device, IP telephone 22 and notification device 24.

In the embodiment shown in FIG. 1, a subscriber profile 26 is disposed within a database that resides in the telecommunications network 14. The subscriber profile 26 contains information related to a subscriber's advanced telephony service preferences, e.g., the advanced telephony services that are associated with the subscriber's incoming and outgoing telephone calls. The subscriber adds to, subtracts from, or otherwise modifies these advanced telephony services preferences via a subscriber control 28, such as a wireline link, a wireless link, an Internet web page, an intranet web page, or the like. The subscriber profile 26 and the subscriber control 28 provide a subscriber with control over the identity and nature of the advanced telephony services that are provided to telephone calls associated with the subscriber or with a telephone number associated with the subscriber.

Figure 2:
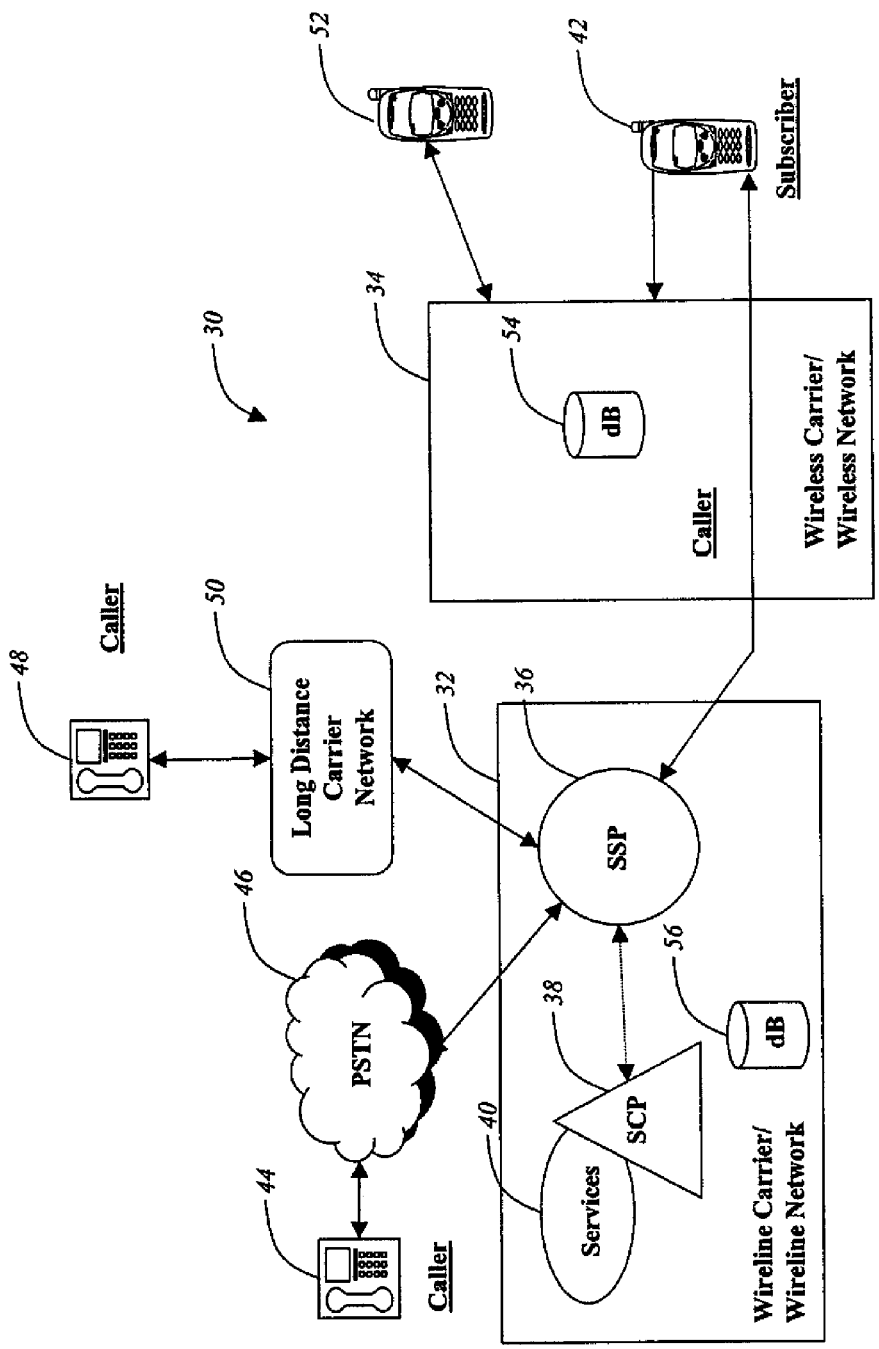
FIG. 2 is a schematic diagram of another embodiment of the system for providing advanced telephony services to a plurality of subscribers using a virtual telephone number, highlighting the use of a wireline telephone number to provide advanced wireless telephony services to a subscriber.

Referring to FIG. 2, in one embodiment of the present invention, the system 30 for providing advanced telephony services to a plurality of subscribers includes a wireline carrier network 32 in communication with a wireless carrier network 34. In the embodiment shown, the wireline network is the service-providing network and the wireless network is the native transport network. In other embodiments, both the service-providing network and the native transport network can be either a wireline, wireless, packet voice-based, or other type of telecommunications network. In the embodiment shown, the wireline network 32 is an advanced intelligent network (AIN). An AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference. Although described in detail with reference to the AIN of FIG. 2, embodiments of the present invention may utilize other types of wireline and wireless networks such as packet-switching networks.

In the embodiment shown in FIG. 2, the wireline carrier network 32 includes a service switching point (SSP) 36 in communication with a service control point (SCP) 38. The SSP 36 is a central office switch that provides intelligent network functionality. When a call is placed or received at the SSP 36, the SSP 36 collects the dialed digits and generates a trigger. A trigger generates a packet that is sent to the SCP 38. The SCP 38 includes computer processors, application software, and databases that control the routing, monitoring, processing, and termination of phone calls. In the embodiment shown, the SCP 38 is operable for providing a plurality of advanced telephony services 40 to a subscriber 42, such as a wireless subscriber in the example shown. For example, the SCP 38 may be operable for providing a privacy director service or a usage monitoring service to the subscriber 42 and the telephone call.

In one embodiment, a caller places a call 12 by dialing the subscriber's listed telephone number, which exists in the wireline network. When the telephone call 12 encounters the wireline telephone number at the SSP 36, a terminating attempt trigger (TAT) or other similar terminating trigger is generated. Any and all services for the subscriber is subsequently provided by the network intelligence in the wireline (service-providing) network. Following the application of subscribed advanced services, the service-providing (wireline) network forwards the call to the wireless telephone number associated with the wireline telephone number, the call is accordingly routed to the native transport (wireless) network and is then completed to the subscriber's wireless telephone. Accordingly, advanced services are applied by the wireline network for a call whose native transport would normally be a wireless network with limited or no advanced services capabilities.

The wireline carrier network 32 and the SSP 36 are in communication with a plurality of callers, such as a first wireline caller 44 via the PSTN 46 and a second wireline caller 48 via a long distance or inter-exchange carrier network 50. The wireless carrier network 34 is also in direct communication with a plurality of callers, such as a third caller 52. The wireline carrier network 32 includes components, such as SCP 38, necessary to provide services. A first database 54 resides within the wireless carrier network 34 and a second database 56 resides with the wireline carrier network 32. Both the first database 54 and the second database 56 are associated with algorithms, which are operable for associating a wireline or virtual telephone number, with another telephone number, such as another wireline telephone number, a wireless telephone number, or a packet voice-based telephone number. Alternatively, the algorithms may be operable for associating a telephone number assigned to a wireline network with the wireless service provider's subscriber. By assigning a virtual telephone number or other telephone number to the subscriber's wireless telephone number, the service provider is able to disassociate the services from the physical device and even the wireless telephone number. Advantageously, advanced telephony services are associated with this virtual telephone number. In the example shown, the first database 54, the second database 56, and the associated algorithms are operable for associating a wireline telephone number with a wireless telephone number associated with the subscriber 42.

Figure 3:
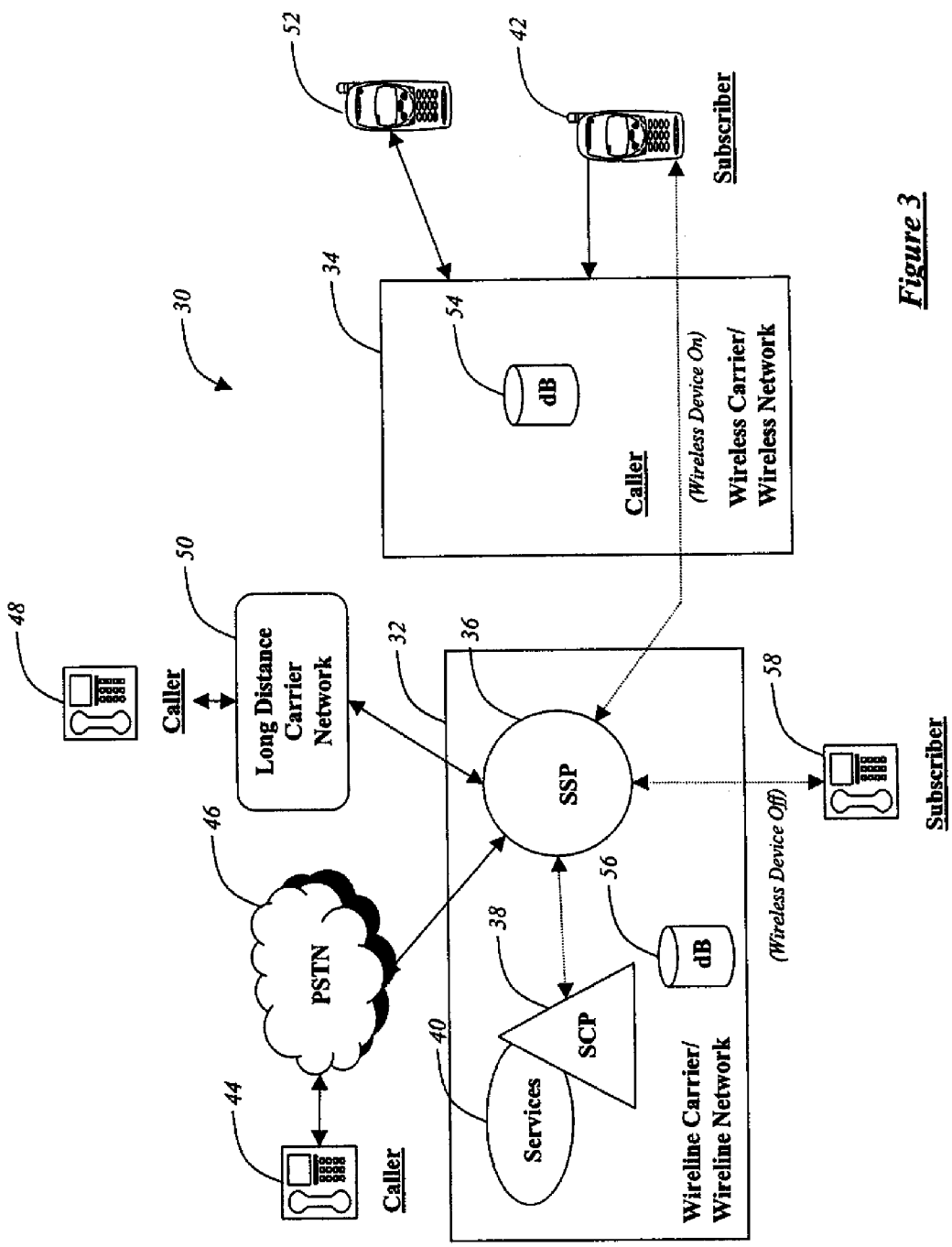
FIG. 3 is a schematic diagram of a further embodiment of the system for providing advanced telephony services to a plurality of subscribers using a virtual telephone number, highlighting the use of a wireline telephone number to provide advanced wireless telephony services to a subscriber and an alternative wireline telephone or device.

Referring to FIG. 3, in a further embodiment of the present invention, the system 30 for providing advanced telephony services to a plurality of subscribers using a virtual telephone number also includes a wireline telephone or device 58 belonging to the subscriber 42 and in direct communication with the wireline carrier network 32 and the SSP 36. Telephone calls to the subscriber 42 at the wireless telephone number routed through the wireline carrier network 32 may be terminated to the wireline telephone or device 58 in the event that the subscriber's wireless telephone or device 42 is unavailable.

Figure 4:
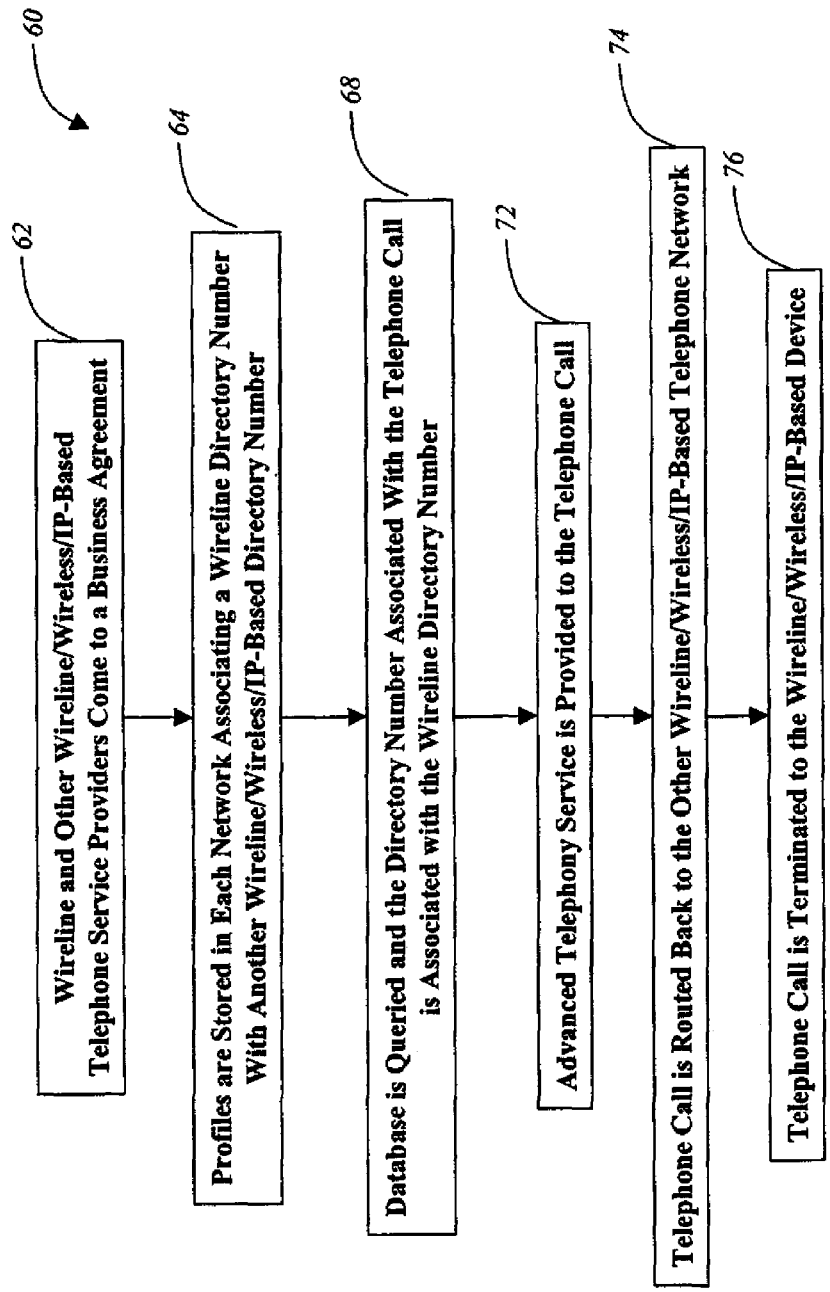
FIG. 4 is a flow chart of one embodiment of a method for providing advanced telephony services to a plurality of subscribers using a virtual telephone number.

Referring to FIG. 4, in one embodiment of the present invention, a method 60 for providing advanced telephony services to a plurality of subscribers using a virtual telephone number includes a wireline telephone service provider and another wireline telephone service provider (such as a competitive local-exchange carrier (CLEC) or an inter-exchange carrier), a wireless telephone service provider, and/or a packet voice-based telephone service provider reaching a business agreement regarding the sharing and mutual use of a telephone number, such as a wireline telephone number, with which advanced telephony services are associated. (Block 62). The wireline telephone service providers, the wireless telephone service provider, and/or the packet voice-based telephone service provider each store a subscriber profile in a database residing in the wireline telephone networks 56, the wireless telephone network 54, and/or the packet voice-based telephone network (not shown), respectively. (Block 64). A telephone call that is intended to be completed to the wireless network is received first in the wireline telephone network 32 (by virtue of the wireless/wireline number association accomplished by Blocks 62, 64, and 68). The wireless telephone number, and/or the packet voice-based telephone number associated with the telephone call is associated with the wireline telephone number to which services are associated (Block 68). The telephone number to which services are associated may be, for example, the subscriber's home or business telephone number. However, embodiments of the present invention are not limited to telephone numbers linked to physical terminating devices in a home or residence. In one embodiment, the telephone number is a "virtual" telephone number created expressly to support the association of advanced services in the wireline network 32 in an embodiment of the present invention. In another embodiment, the telephone number is an actual number that is associated with the subscriber. Although either type of number may be used, for the sake of simplicity in describing embodiments of the present invention, the telephone number to which services are associated will hereinafter be referred to as the "virtual telephone number."

Referring again to FIG. 4, the service-providing network (the wireline telephone network associated with the virtual directory number) provides advanced telephony services for the call. The SCP 38, by utilizing the subscriber profile disposed within the database 56 residing within the wireline telephone network 32 associated with the virtual telephone number, and an associated algorithm, provides an advanced telephony service to the telephone call. (Block 72). Finally, the SCP 38 or SSP 36 routes the telephone call to the appropriate telecommunications network, such as wireline telephone network 32, wireless telephone network 34, or packet voice-based telephone network (not shown) (Block 74) where the call is terminated to the appropriate wireline telephone or device, wireless telephone or device, or packet voice-based telephone or device (Block 76).

Changes to the telecommunications networking messages may be necessary to properly handle the call. For example, after the wireline network 32 provides advanced telephony services to the telephone call 12, the wireline network 32 routes the call to the network in communication with the terminating device. When routing the call back to the terminating devices network, the wireline network 32 modifies the messages accompanying the call so that the call is not routed back to the wireline network 32 in an endless loop. The wireline network 32 may also make other modification. For example, to accurately reflect the party placing to call to the subscriber, the caller ID information associated with the call may be modified.

Figure 5:
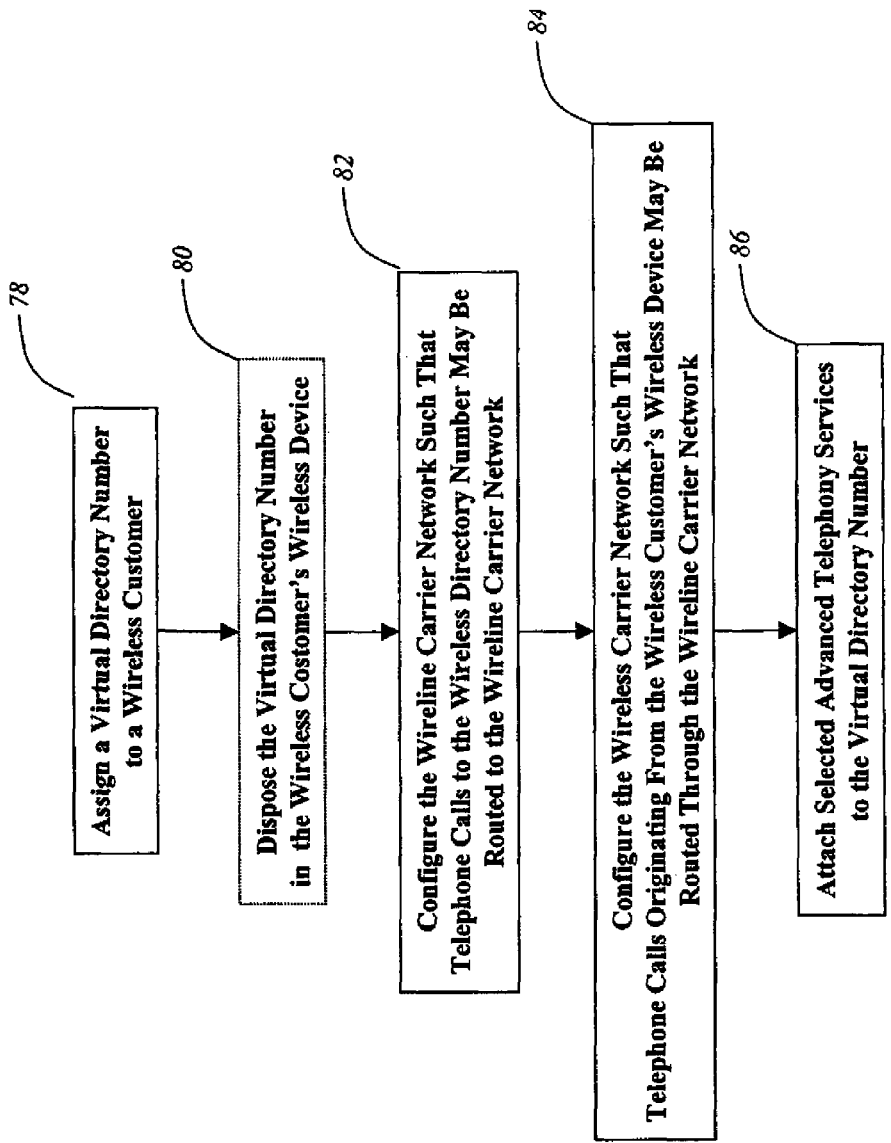
FIG. 5 is a flow chart of another embodiment of the method for providing advanced telephony services to a plurality of subscribers using a virtual telephone number, highlighting the use of a wireline telephone number to provide advanced wireless telephony services to a subscriber.
Figure 6:
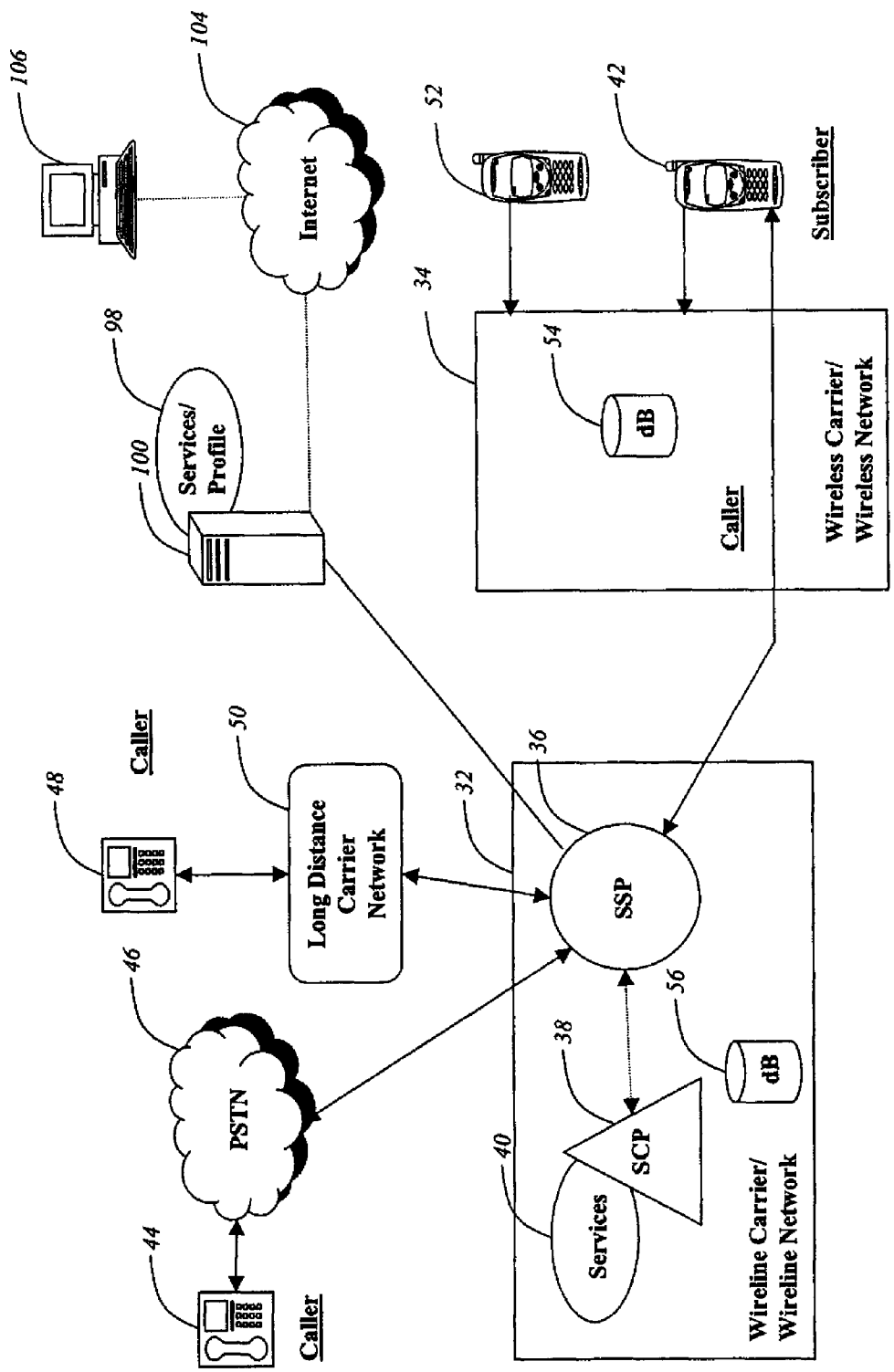
FIG. 6 is a schematic diagram of a further embodiment of the system for providing advanced telephony services to a plurality of subscribers using a virtual telephone number, highlighting the use of a wireline telephone number to provide advanced IP-based telephony services to a subscriber.

Referring to FIG. 5, in an alternative embodiment of the present invention, a wireline telephone number is assigned to a wireless subscriber, i.e., to a wireless telephone or device having a wireless telephone number. (Block 78). Optionally, this wireline telephone number is disposed within a memory device of the wireless telephone or device. (Block 80). The service provider then configures the wireline carrier network 32 such that telephone calls to the wireless telephone number may be routed to the wireline carrier network (Block 82) and associated with the wireline telephone number. The wireless service provider also configures the wireless carrier network 36 such that telephone calls originating from the wireless telephone or device 42 may be routed through the wireline carrier network 34 (Block 84) and associated with the wireline telephone number. Predetermined advanced telephony services are provided to the telephone calls associated with the wireline directory number (Block 86) prior to the telephone calls being routed to the proper destination.

The processes and the functions of the structures involved in embodiments of the present invention are illustrated below in the following examples.

Wireline Caller Calls Wireless Subscriber:

When a wireline caller 44 calls a wireless subscriber 42 at a conventional wireless telephone number, via the PSTN 46 or a long distance carrier network 50, the wireless or other service provider routes the telephone call a wireline carrier network 32 configured to provide advanced telephony services to a virtual telephone number associated with the wireless telephone number. This association is carried out by a database and an algorithm disposed within the wireline carrier network 32 operable for associating the conventional wireless telephone number with the virtual telephone number. An SCP 38 provides a plurality of advanced telephony services to the telephone call, such as a privacy director service, a usage monitoring service, an audio calling name service, or the like. The SCP 38 or other network element then routes the telephone call to the wireless carrier network 34 associated with the conventional wireless telephone number and is terminated to the wireless telephone or device 42 associated with the conventional wireless telephone number.

Wireless Caller Calls Wireless Subscriber:

When a wireless caller calls the wireless subscriber 42 at the conventional wireless telephone number, via a wireless carrier network 34, the conventional wireless telephone number is associated with a virtual telephone number within the wireless carrier network 34. This association is carried out by a database 54 and an algorithm disposed within the wireless carrier network 34 operable for associating the conventional wireless telephone number with the virtual telephone number. The wireless carrier network 34 routes the telephone call to the wireline carrier network 32 associated with the virtual telephone number, and the SCP 38 provides a plurality of advanced telephony services to the telephone call, such as the privacy director service, the usage monitoring service, the audio calling name service, or the like. The SCP 38 then routes the telephone call to the wireless carrier network 34 associated with the conventional wireless telephone number and to the wireless telephone or device 42 associated with the conventional wireless telephone number.

Wireless Subscriber Calls Wireline Party:

When the wireless subscriber at the conventional wireless telephone number calls a wireline party, via the wireless carrier network 34, the conventional wireless telephone number is associated with a virtual telephone number within the wireline carrier network 32. This association is carried out by a database 54 and an algorithm disposed within the wireless carrier network 34 operable for associating the conventional wireless telephone number with the virtual telephone number. The telephone call is then routed to the wireline carrier network 32 associated with the virtual telephone number and the SCP 38 provides a plurality of advanced telephony services to the telephone call, such as the privacy director service, the usage monitoring service, the audio calling name service, or the like. The telephone call is then routed to a wireline carrier network 32, the PSTN 46, and/or a long distance carrier network 50 associated with the wireline telephone number associated with the wireline party and is terminated to the wireline telephone or device associated with wireline telephone number associated with the wireline party.

Wireless Subscriber Calls Wireless Party:

When the wireless subscriber at the conventional wireless telephone number calls a wireless party, via the wireless carrier network 34, the conventional wireless telephone number is associated with a virtual telephone number within the wireline carrier network 32. This association is carried out by a database 54 and an algorithm disposed within the wireless carrier network operable for associating the conventional wireless telephone number with the virtual telephone number. The telephone call is then routed to the wireline carrier network associated with the virtual telephone number and the SCP 38 provides a plurality of advanced telephony services to the telephone call, such as the privacy director service, the usage monitoring service, the audio calling name service, or the like. The telephone call is then routed to a wireless carrier network 34 associated with the wireless telephone number associated with the wireless party and is terminated to the wireless telephone or device 42 associated with wireless telephone number associated with the wireless party.

An embodiment of the present invention may include other or additional features. For example, in one embodiment, the SCP 38 is in communication with a web server 100 via a transmission control-protocol/Internet-protocol (TCP/IP) 102. The subscriber profile and/or the subscriber preferences related to the plurality of advanced telephony services may be stored in the web server 100. Advantageously, this configuration combines the reliability of the wireline telephone service provider's network 32 with the flexibility of the Internet via the SCP 38.

When a telephone call originates from or is terminated to the subscriber's wireline telephone number, the web server 100 is queried for the subscriber profile and/or the subscriber preferences related to the plurality of advanced telephony services. The SCP 38 acts as a "protocol interpreter." The subscriber profile and/or the subscriber preferences related to the plurality of advanced telephony services may be added to, subtracted from, and/or modified by the subscriber via, for example the Internet 104 and a personal computer (PC) 106.

As described above, a usage monitoring service allows a subscriber to prepay for a "bucket" or predetermined amount of telephone usage time, or to sign an agreement agreeing to pay a plurality of different rates for a plurality of predetermined levels of telephone usage time. For example, the subscriber may agree to pay a higher rate for a relatively low level of telephone usage time and a lower rate for a relatively high level of telephone usage time. In any case, the usage monitoring service requires a wireline telephone service provider to keep careful track of the subscriber's telephone usage time across various disparate networks, e.g., wireline, wireless, and packet voice-based.

The systems and methods of the present invention allow a wireline telephone service provider to keep track of a subscriber's telephone usage time. Advantageously, this telephone usage time can be tracked and monitored for any combination of wireline telephone or device, wireless telephone or device, or packet voice-based telephone or device associated with the virtual directory number. Preferably, an algorithm disposed within the wireline telephone network 32 associated with the virtual telephone number performs this tracking and monitoring, and the resulting data and information is stored in a database 56 within the wireline telephone network 32. The algorithm counts usage minutes any time a call is received from or routed to the virtual telephone number. Thus, the wireline telephone service provider associated with the virtual telephone number and other wireline telephone service providers, wireless telephone service providers, and packet voice-based telephone service providers using the virtual telephone number may offer a universal usage monitoring service, covering all of a subscriber's telephones or devices. Such a usage monitoring service might be a billing service or call logging service. The wireline (service-providing) network in which the virtual telephone number exists is able to perform this functionality since it is embedded within the call path for the duration of the call and is therefore able to monitor connection start times, end times, durations, and other call control signaling events.

When a service provider provides services, a billing system in communication with the service provider's network gathers information necessary for generating a bill. In one embodiment of the present invention, a service management system (SMS) (not shown) creates and maintains the necessary billing records for each subscriber activating or using advanced telephony services. In another embodiment, the SCP 38 creates and maintains billing records for each subscriber.

Although the present invention has been shown and described with reference to preferred embodiments and examples thereof, other embodiments and examples may achieve the same results and/or perform similar functions. Accordingly, changes in and modifications to the present invention will be apparent to those of ordinary skill in the art without departing from the spirit or scope of the present invention. The following claims are intended to cover all such equivalent embodiments and examples.

That which is claimed:

1. A method for providing an advanced intelligent service, comprising:
    associating a dialed number to an advanced telephony service;
    associating the advanced telephony service to a virtual number in a service providing network;
    receiving a call to the dialed number in a native transport network having limited capability of providing advanced telephony service; and
    when the advanced telephony service is required, then routing the call to the virtual number in the service-providing network to receive the advanced telephony service from the service-providing network.

2. The method according to claim 1, further comprising monitoring a start time of the advanced telephony service.

3. The method according to claim 1, further comprising monitoring an end time of the advanced telephony service.

4. The method according to claim 1, further comprising billing a provider of the native transport network for the advanced telephony service.

5. The method according to claim 1, further comprising routing the call to a destination.

6. The method according to claim 1, further comprising billing a subscriber for the advanced telephony service.

7. The method according to claim 1, further comprising billing a subscriber associated with the dialed number for the advanced telephony service.

8. The method according to claim 1, further comprising retrieving a profile associated with the dialed number.

9. The method according to claim 1, further comprising retrieving caller identification associated with the call.

10. The method according to claim 1, wherein associating the dialed number with the advanced telephony service comprises associating the dialed number with at least one of a call delivery service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, an a personal identification number (PIN) override service.

11. The method according to claim 1, wherein routing the call to the virtual number in the service-providing network comprises routing the call to at least one of a wireline network, a wireless network, and a packet-switching network.

12. The method according to claim 1, wherein receiving the call to the dialed number in the native transport network comprises receiving the call in at least one of a wireline network, a wireless network, and a packet-switching network.

13. A system, comprising:
    a server executing an algorithm and communicating with a database, the algorithm causing the server to:
    associate a dialed number to an advanced telephony service;
    associate the advanced telephony service to a virtual number in a service providing network;
    receive a call to the dialed number in a native transport network having limited capability of providing advanced telephony service; and
    when the advanced telephony service is required, then route the call to the virtual number in the service-providing network to receive the advanced telephony service from the service-providing network.

14. The system according to claim 13, wherein the algorithm further causes the server to monitor a start time of the advanced telephony service.

15. The system according to claim 13, wherein the algorithm further causes the server to monitor an end time of the advanced telephony service.

16. The system according to claim 13, wherein the algorithm further causes the server to bill a provider of the native transport network for the advanced telephony service.

17. The system according to claim 13, wherein the algorithm further causes the server to bill a subscriber for the advanced telephony service.

18. A method, comprising:
    associating a dialed number to an advanced service;
    associating the advanced service to a virtual number in a service providing network;
    receiving a call directed to the dialed number in an unintelligent wireless network;
    determining the advanced service is required; and
    routing the call from the unintelligent wireless network to the virtual number in the intelligent network for receiving the advanced service.

19. The method according to claim 18, further comprising routing the call to a destination.

20. The method according to claim 18, further comprising billing for the advanced telephony service.

* * * * *